United States Patent
Soliman

(10) Patent No.: US 6,950,417 B2
(45) Date of Patent: *Sep. 27, 2005

(54) METHOD AND APPARATUS FOR DETECTING FORWARD AND REVERSE LINK IMBALANCE IN DIGITAL CELLULAR COMMUNICATION SYSTEMS

(75) Inventor: Samir S. Soliman, San Diego, CA (US)

(73) Assignee: Qualcom, Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/703,883

(22) Filed: Nov. 7, 2003

(65) Prior Publication Data

US 2004/0052230 A1 Mar. 18, 2004

Related U.S. Application Data

(63) Continuation of application No. 09/166,553, filed on Oct. 5, 1998, now Pat. No. 6,785,249.

(51) Int. Cl.⁷ .............................................. H04B 7/216
(52) U.S. Cl. .................... 370/335; 370/331; 455/67.11; 455/436
(58) Field of Search ................................ 370/331–332, 370/335, 342; 455/67.11, 436–438, 423

(56) References Cited

U.S. PATENT DOCUMENTS

| | | | |
|---|---|---|---|
| 5,422,909 A | 6/1995 | Love et al. | |
| 5,594,946 A | 1/1997 | Menich | |
| 5,822,699 A | 10/1998 | Kotzin et al. | |
| 5,901,354 A | 5/1999 | Menich et al. | |
| 5,913,167 A | 6/1999 | Bonta et al. | |
| 5,920,549 A | 7/1999 | Bruckert et al. | |
| 5,920,550 A | 7/1999 | Willey | |
| 5,956,641 A | 9/1999 | Bruckert et al. | |
| 5,987,012 A | 11/1999 | Bruckert et al. | |
| 6,021,123 A | 2/2000 | Mimura | |
| 6,785,249 B2 * | 8/2004 | Soliman | 370/335 |

FOREIGN PATENT DOCUMENTS

| | | |
|---|---|---|
| EP | 0 475 698 B1 | 3/1992 |
| GB | 2314734 | 1/1989 |
| GB | 2320654 | 6/1998 |
| WO | 95/34179 | 12/1995 |
| WO | 98/20640 | 5/1998 |

* cited by examiner

*Primary Examiner*—Steven Nguyen
(74) *Attorney, Agent, or Firm*—Philip R. Wadsworth; Thien T. Nguyen

(57) ABSTRACT

An apparatus for detecting forward and reverse link imbalances in a digital cellular communication system is provided. An indication of maximum access probes is used to determine whether a link imbalance caused a reverse link failure to occur. The maximum access probes condition indicates that a wireless unit has attempted to access a base station a pre-defined maximum number of times. An indication of a lost paging channel and a traffic channel initialization (TCI) time out is used to determine whether a link imbalance caused a forward link failure to occur. If the wireless unit did not lose the paging channel, the apparatus determines whether a TCI time out occurred. If the wireless unit lost the paging channel, or it did not lose the paging channel but a TCI time out occurred, the apparatus determines the cause for the forward link failure.

9 Claims, 4 Drawing Sheets

TYPICAL WIRELESS UNIT BLOCK DIAGRAM

METHOD AND APPARATUS FOR DETECTING FORWARD AND REVERSE LINK IMBALANCE IN DIGITAL CELLULAR COMMUNICATION SYSTEMS

CLAIM OF PRIORITY UNDER 35 U.S.C. § 120

The present Application for Patent is a Continuation and claims priority to Patent Application Ser. No. 09/166,553 entitled "METHOD AND APPARATUS FOR DETECTING FORWARD AND REVERSE LINK IMBALANCE IN DIGITAL CELLULAR COMMUNICATION SYSTEMS" filed Oct. 5, 1998 now U.S. Pat. No. 6,785,249, and assigned to the assignee hereof and hereby expressly incorporated by reference herein.

BACKGROUND

1. Field

This invention relates to digital wireless communication systems, and more particularly to methods for detecting forward and reverse link imbalances in digital wireless communications systems.

2. Background

Wireless communication systems facilitate two-way communication between a plurality of subscriber mobile radio stations or "wireless units" and a fixed network infrastructure. Typically, the wireless units communicate with the fixed network infrastructure via a plurality of fixed base stations. Exemplary systems include such mobile cellular telephone systems as Time Division Multiple Access (TDMA) and Code Division Multiple Access (CDMA) systems, and Frequency Division Multiple Access (FDMA) systems. The objective of these digital wireless communication systems is to provide communication channels on demand between the wireless units and the base stations in order to connect the wireless unit users with the fixed network infrastructure (usually a wired-line system).

Wireless units typically communicate with base stations using a duplexing scheme that allows for the exchange of information in both directions of connection. Transmissions from a base station to a wireless unit are commonly referred to as "downlink" transmissions. Transmissions from a wireless unit to a base station are commonly referred to as "uplink" transmissions. In CDMA and FDMA communication systems, the downlink is commonly referred to as the "forward" link and the uplink is commonly referred to as the "reverse" link. A well-known problem in cellular communication systems is system performance degradation caused by signal strength imbalances in the forward and reverse links. To mitigate this problem, cellular communication system designers attempt to ensure that signal path losses tolerated by the reverse links are equal to or approximately equal to those tolerated by the forward links. One important design objective is to balance the forward and reverse links. Unfortunately, due to dynamically changing network conditions such as system loading, antenna pattern mismatches, differences in antenna gains, and other channel variations, imbalances still occur. In cellular communication systems such as CDMA and FDMA, forward and reverse link imbalances often cause degraded system performance.

Therefore, balancing the forward and reverse links is a very important design goal in wireless digital communication systems. Unless the links are balanced, system performance is degraded. For example, under weak reverse link conditions (i.e., the reverse link is weaker than the forward link) wireless units attempt to access their associated base stations by generating multiple access probes until all of the access probes are exhausted. These multiple access attempts result in increased channel interference on the reverse link. Under weak forward link conditions (i.e., the forward link is weaker than the reverse link) wireless units are unable to receive acknowledgment messages on their associated forward links. Consequently, the wireless units will not declare service, initiate calls, nor respond to base station orders.

Unfortunately, link imbalances are indiscernible by the prior art wireless units. Consequently, the prior art wireless units exhibit undesirable behavior in the presence of link imbalances. For example, in a weak reverse link condition, the prior art wireless units can become locked into a digital mode of operation when the digital system is, in fact, unavailable for service. This occurs when the wireless unit receives a strong signal on the forward link paging channel. However, the reverse link is weak. Although the wireless unit is unable to register or originate calls on the reverse link, it believes that digital service is available due to the strong paging channel signal. Therefore, even though an alternative analog system may be available, the mobile is locked into a useless digital mode of operation. Performance also degrades when the reverse link is stronger than the forward link. Under these conditions, the wireless unit can communicate with the base station. However, because of the relatively weak forward link, the wireless unit cannot decipher the control information transmitted by the base station. In either scenario, calls are disadvantageously lost, and system call delivery rates are reduced. A better understanding of the performance problems created by link imbalances can be obtained by briefly reviewing simple call flow examples in a CDMA communication system.

CDMA Call Flow Examples and CDMA Call Handshake Protocols

Tables 1 and 2 show simple call flow examples as set forth in the Telecommunications Industry Association (TIA) specification governing the operation of CDMA wireless unit and base station equipment. The TIA specification is entitled "Wireless unit-Base Station Compatibility Standard for Dual-Mode Wideband Spread Spectrum Cellular System," TIA/EIA/IS-95-A, was published in May 1995 by the Telecommunications Industry Association, and is referred to hereafter as the IS-95 specification. As set forth in the IS-95 specification, Tables 1 and 2 follow the following conventions:

All messages are received without error.

Receipt of messages is not shown (except in the handoff examples).

Acknowledgements are not shown.

Optional authentication procedures are not shown.

Optional private long code transitions are not shown.

TABLE 1

Simple Call Flow Example - Wireless unit Origination

| Wireless unit | | | | Base Station |
|---|---|---|---|---|
| Detects user-initiated call | | | | |
| Sends Origination Message | > | Access Channel | > | Sets up Traffic Channel Begins sending null Traffic Channel data |
| Sets up Traffic Channel | < | Paging Channel | < | Sends Channel Assignment Message |
| Receives $N_{sm}$ consecutive valid frames | | | | |
| Begins sending the Traffic Channel preamble | | | | Acquires the Reverse Traffic Channel |
| Begins transmitting null Traffic Channel data | < | Forward Traffic Channel | < | Sends Base Station Acknowledgement Order |
| Begins processing primary traffic in accordance with Service Option 1 | < | Forward Traffic Channel | < | Sends Service Option Response Order |
| Optional | | | | Optional |
| Sends Origination Continuation Message | > | Reverse Traffic Channel | > | |
| Optional | | | | Optional |
| Applies ring back in audio path | < | Forward Traffic Channel | < | Sends Alert With Information Message (ring back tone) |
| Optional | | | | Optional |
| Removes ring back from audio path | < | Forward Traffic Channel | < | Sends Alert With Information Message (tones off) |
| (User conversation) | | | | (User conversation) |

TABLE 2

Simple Call Flow Example - Wireless unit Termination

| Wireless unit | | | | Base Station |
|---|---|---|---|---|
| | < | Paging Channel | < | Sends Page Message or Slotted Page Message |
| Sends Page Response Message | > | Access Channel | > | Sets up Traffic Channel Begins sending null Traffic Channel data |
| Sets up Traffic Channel | < | Paging Channel | < | Sends Channel Assignment Message |
| Receives $N_{sm}$ consecutive valid frames | | | | |
| Begins sending the Traffic Channel preamble | | | | Acquires the Reverse Traffic Channel |
| Begins transmitting null Traffic Channel data | < | Forward Traffic Channel | < | Sends Base Station Acknowledgement Order |
| Begins processing primary traffic in accordance with Service Option 1 | < | Forward Traffic Channel | < | Sends Service Option Response Order |
| Starts ringing | < | Forward Traffic Channel | < | Sends Alert With Information Message (ring) |
| User answers call | | | | |
| Stops ringing | | | | |
| Sends Connect Order | > | Reverse Traffic Channel | > | |
| Begins sending primary traffic packets from the Service Option 1 application | | | | |
| (User conversation) | | | | (User conversation) |

Table 1 shows a simple call flow example wherein a wireless unit originates a call. Messages are transmitted from the wireless unit to the base station using the access channel. Messages are transmitted from the base station to the wireless unit using the paging channel. As shown in Table 1, the wireless unit first detects a user-initiated call, and then sends an "origination" message via the CDMA access channel. The access channel is a slotted random access channel. The wireless unit transmits on the access channel using a random access procedure. Many parameters of the random access procedure are supplied by the base station in an access parameters message. The entire process of transmitting one message and receiving (or failing to receive) an acknowledgement for that message is called an "access attempt." Each transmission in the access attempt is called an "access probe." Within an access attempt, access probes are grouped into access probe sequences. Each access probe sequence comprises a fixed number of access probes. The first access probe of each access probe sequence is transmitted at a specified power level relative to the nominal open loop power level. Each subsequent access probe is transmitted at a power level that is a specified amount higher than the previous access probe.

During normal CDMA operation, when a wireless unit user initiates a phone call, the wireless unit sends an access probe to the base station. If the base station properly receives the access probe, the wireless unit should receive back an acknowledgement from the base station. Once the wireless unit receives the acknowledgement, the wireless unit is instructed by the base station to wait and to stop sending further access probes to the base station. This is necessary because too many access probes will produce undesirable interference on the communication channel. The wireless unit therefore waits until it is assigned a communication channel by the base station. As shown in Table 1, the base station informs the wireless unit of the channel assignment by sending a channel assignment message via the paging channel.

Once the wireless unit receives its channel assignment from the base station, it changes its receive and transmit frequencies to the assigned channel. The wireless unit then attempts to initiate communication on the assigned channel by establishing or "setting up" the traffic channel. If the traffic channel initialization is successful, the wireless unit then acquires the traffic channel. The wireless unit then begins sending a traffic channel preamble. As shown in Table 1, the base station acquires the reverse traffic channel and sends a base station acknowledgement order to the wireless unit if the reverse traffic channel was properly acquired. At this point, the wireless unit and the base station begin negotiating service. The communication link can fail at any point during this negotiation process. However, if the negotiation process is successful, communication commences, and a telephone conversation commences.

Table 2 shows a simple call flow example wherein a wireless unit terminates a call. As shown in Table 2, during normal operation, when a call is initiated by a base station the base station sends a page or slotted page message to the wireless unit via the paging channel. The wireless unit then sends a page response message to the base station via the access channel. The base station then establishes a traffic channel and begins sending null traffic channel data to the wireless unit. The base station then sends a channel assignment message to the wireless unit via the paging channel. As described above with reference to Table 1, once the wireless unit receives its channel assignment from the base station, it changes its receive and transmit frequencies to the assigned channel. The wireless unit then attempts to initiate communication on the assigned channel by setting up the traffic channel. As before, if the traffic channel initialization is successful, the wireless unit acquires the traffic channel and processes primary traffic. Soon thereafter, if the communication negotiation is successful, communication commences via the forward and reverse channel pair. With the call flow examples in mind, it is now possible to more fully describe the problems created by link imbalances in a cellular communication system.

Call Delivery Failures Due to Link Imbalances

Under some network conditions, the forward link is intentionally made stronger than the reverse link resulting in an extended CDMA forward link coverage area. In areas with neighboring analog cells, it is possible for a dual mode wireless unit to receive a valid signal on the CDMA paging channel while in the analog coverage area. As described above, this causes the wireless unit to lock into a digital (in this case, CDMA) mode of operation. Disadvantageously however, the wireless unit will be unable to register or originate a call within the CDMA cell because it is beyond its reverse link coverage range. Stated another way, under these network conditions, wireless units become confused into relying upon valid CDMA coverage when, in fact, there is none. Disadvantageously, the wireless unit is unaware of the link imbalance problem. Rather than locking into a digital operational mode, the dual mode wireless units preferably should remain in an analog operational mode.

In contrast, network conditions exist wherein the reverse link is stronger than the forward link. For example, in personal communication systems (PCS), the reverse link is favored due to weak coding characteristics of the link and also due to inherent limitations of the high power amplifier (HPA). The coding characteristics of the 13 kb/s link can cause the forward link to be weaker than the reverse link. Coding for the 13 kb/s PCS systems is not as robust or efficient as is the coding for the 8 kb/s systems. In addition, the HPA has a limited amount of power, and therefore can cause the forward link to be weaker than the reverse link under certain circumstances. Consequently, calls fail either during call setup due to the fading characteristics of the paging channel or during forward traffic channel initialization.

Other factors contribute to link imbalance conditions. Link imbalances can be caused by variations in base station antenna gains and antenna pattern mismatches. In addition, greater path loss in the forward link relative to the reverse link can cause the forward link to be weaker than the reverse link. Additionally, co-channel interference from neighboring base stations can result in weaker forward links. In accordance with the IS-95 specification, each CDMA base station continuously transmits an unmodulated, direct-sequence spread spectrum signal referred to as the "pilot channel". The pilot channel is transmitted at all times by the base station on each active forward CDMA channel. In addition to facilitating other wireless unit functions, the pilot channels allow the wireless units to perform signal strength comparisons between base stations. Unfortunately, the pilot channels of nearby base stations can interfere with one another resulting in weak forward channel strengths. The interfering pilot channels may or may not be on a wireless unit's neighbor list.

Also, weak forward link conditions may be caused by interference sources that are external to the CDMA system. Finally, weak forward links can occur due to inadequate traffic channel power allocation at initialization. Weak forward channel conditions are characterized by poor paging channel performance, which can cause the paging channels to be lost while the wireless unit is in the System Access State. Weak forward channel conditions can also lead to Traffic Channel Initialization failures, failures in receiving Channel Assignment messages, and failures in receiving Base Station Acknowledgement Orders.

Whether a wireless unit is attempting to originate or to terminate a call, the call can be lost due to link imbalances. In both cases, call delivery rates will suffer. In addition, system performance is adversely affected when active in-progress calls (i.e., wireless units having active traffic channels carrying in-progress calls) are dropped due to link imbalance conditions. Therefore the need exists for a method and apparatus that detects link imbalances and instructs the wireless unit to process calls in accordance with the detection.

The need exists for a method and apparatus that can detect link imbalances in a cellular communication system and process calls accordingly. The need exists for a means for determining whether in-progress calls are dropped due to link imbalance conditions, and if so, for taking appropriate corrective action. The present invention provides such a method and apparatus. The present invention detects link imbalances in a cellular communication system, determines the relative strengths of the forward and reverse links, and processes calls (originated, terminated and dropped calls) according to the determination.

SUMMARY

The present invention is a novel method and apparatus for detecting forward and reverse link imbalances in a digital cellular communication system and for processing calls accordingly. The present invention improves call delivery rates in a digital cellular communication system by detecting forward and reverse link imbalances, determining which link is weaker, and processing calls in accordance with the determination. The present invention improves system performance by determining whether in-progress calls are dropped due to link imbalance conditions. If so, the present invention takes corrective action during subsequent system accesses.

In a weak reverse link condition, the wireless unit receives a strong received signal strength indication (RSSI) on the forward link, but is unable to communicate using the access channel. Each time the wireless unit attempts to access the digital system, it exhausts all of its assigned access probes, and thereby fails the access process. In contrast, weak forward link conditions are characterized by poor paging channel performance, resulting in the loss of the paging channel. The wireless unit is unable to initiate or receive calls because it cannot receive control information via the paging channel.

The present inventive method determines whether a failure has occurred in either the forward or reverse link. If a failure occurs in either link, the present inventive method determines whether the failure is due to a link imbalance condition. When link imbalances are detected, the present invention uses the link failure cause to determine which link is weaker. Based on this determination, the present invention takes corrective action to establish or re-establish calls. More specifically, in one embodiment of the present invention, the method detects weak reverse link conditions by determining whether a wireless unit has attempted to access a selected base station a predetermined number of times (i.e., whether a maximum number of access probes has been transmitted by the mobile). If so, the method of the present invention switches operation to a secondary digital system (or to an analog system if the secondary digital system attempt fails). In one embodiment, the present inventive method detects weak forward link conditions by detecting failures in either the paging channel or the traffic channel.

If the paging channel is lost, the method determines whether a traffic channel initialization (TCI) timeout occurred. If not, the mobile returns to normal operation, and no link imbalance is found. However, if a TCI timeout occurred, the wireless unit determines what caused the paging channel to be lost. The present method tests the pilot strength to determine whether the paging channel was lost because the wireless unit is too far from the base station, or because of significant interference on the paging channel. The method tests to determine whether another strong pilot channel exists. If so, the method instructs the wireless unit to perform an idle handoff and establish communication with the strong pilot channel. If not, the method causes the wireless unit to perform a "new system exit."

The details of the preferred and alternative embodiments of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION

Figure 1:
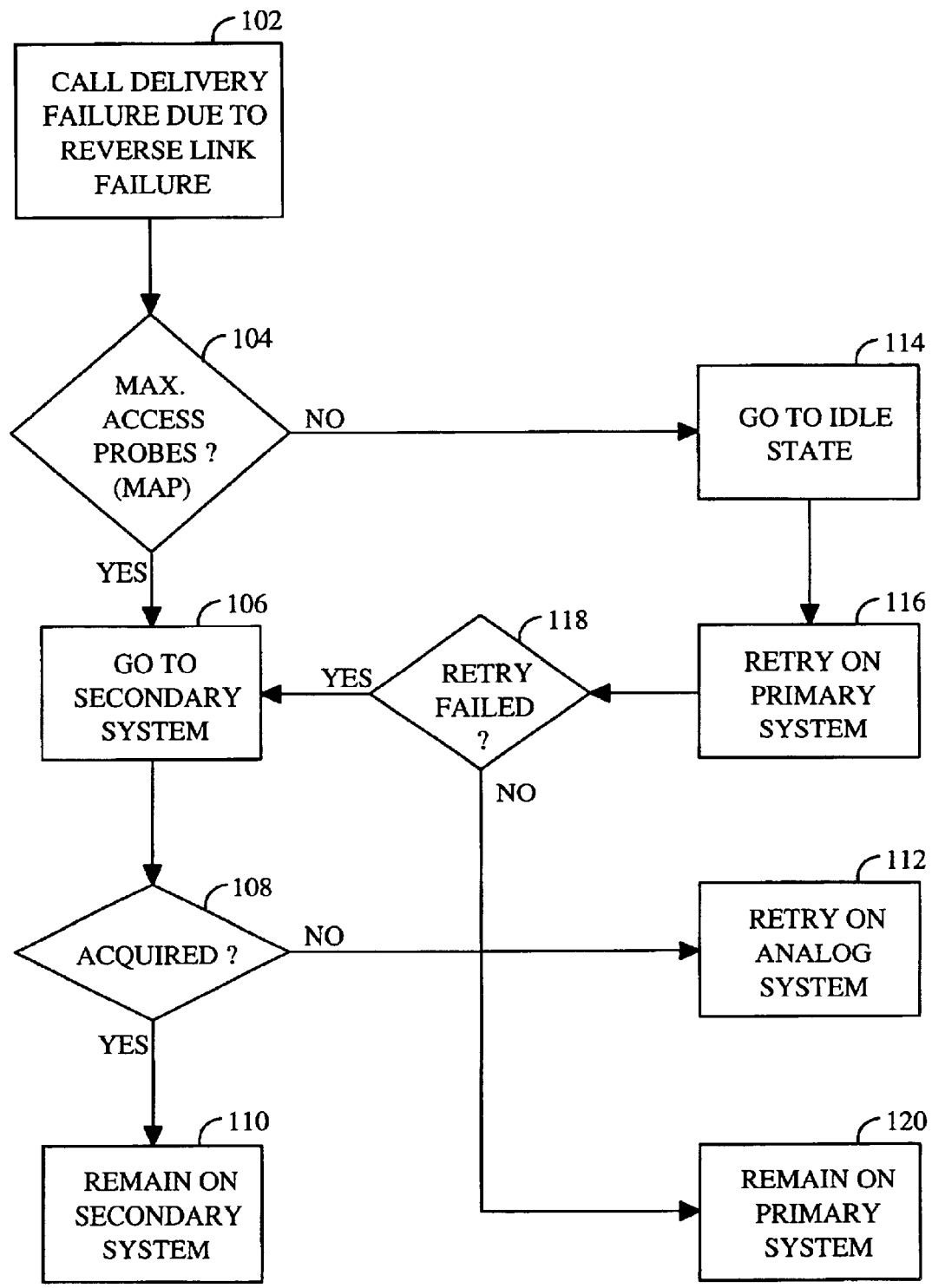
FIG. 1 is a flow diagram showing the present inventive method for determining whether a reverse link failure is due to a weak reverse link.

Throughout this description, the preferred embodiment and examples shown should be considered as exemplars, rather than as limitations, on the present invention.

As described above, one important function performed by the present invention is sifting through the myriad potential causes of call delivery failures in a digital cellular communication system and determining whether link imbalances are responsible for the failures. Once this determination is made, the method and apparatus of the present invention assist the wireless unit in processing calls appropriately, thereby improving call delivery rates. Table 3 shows some error conditions or "symptoms" and the potential causes associated with call delivery failures in a digital cellular communication system.

TABLE 3

Likely Causes of Call Delivery Failures in a CDMA System

| Symptom | Most Likely Cause |
|---|---|
| "Max. access probes" or MAP | Weak reverse link. |
| "Max. access probes" or MAP | Reverse link interference from external sources. |

TABLE 3-continued

Likely Causes of Call Delivery Failures in a CDMA System

| Symptom | Most Likely Cause |
| --- | --- |
| "Max. access probes" or MAP | Reverse link interference from other wireless units with imbalanced links. |
| Failure to receive Paging Channel (PC) Base Station Acknowledgement Order and the pilot power < −100 dBm (cellular) or −103 dBm (PCS). | Weak forward link. |
| Failure to receive Paging Channel (PC) Base Station Acknowledgement Order, however the pilot power > −100 dBm (cellular) or −103 dBm (PCS). | Fading on forward link or interference from other pilots. |
| Failure to receive PC Channel Assignment message. | Reverse/forward link channel fading. |
| Failure to initialize forward traffic channel. | Insufficient traffic channel gains, or fading on forward link, or interference from other pilots |

As shown in Table 3, there are several potential causes of the symptom referred to as "max. access probes (MAP)." This symptom occurs when a wireless unit attempts to access a base station a maximum number of times. In essence, the MAP symptom occurs when the wireless unit exhausts its maximum number of probes sent to a base station. As described above, wireless units attempt to gain access to a base station by sending access attempts, and more particularly access probes, to a base station using the access channel. Each access probe comprises an access channel preamble and an access channel message capsule. In accordance with the IS-95 specification, the wireless unit transmits on an access channel using a random access procedure.

The base stations control the maximum number of access probes (MAP) that can be transmitted by any one wireless unit to any selected base station. The base station transmits the MAP parameter (in addition to other important system parameters) in an "access parameters message" via the paging channel. In accordance with the IS-95 specification, the entire process of sending one message and receiving (or failing to receive) an acknowledgment for that message is referred to as an "access attempt." Within each access attempt, access probes are grouped into access probe sequences. Each access probe sequence comprises a specified number of access probes, all transmitted on the same access channel. The first access probe of each access probe sequence is transmitted at a specified power level relative to the nominal open-loop power level. Each subsequent access probe within a sequence is transmitted at a power level that is a specified amount higher than the previous access probe. The access channel used for each sequence is chosen on a pseudo-random basis from among all of the access channels associated with the wireless unit's current paging channel.

There is a maximum number (typically 15) of access probe sequences (referred to as either "MAX_RSP_SEQ" [for responses] or "MAX_REQ_SEQ" [for requests] associated with each access attempt). Therefore, in one embodiment, the MAP parameter is determined by multiplying the number of access probes per access probe sequence by the maximum number of access probe sequences allowed per access attempt. For example, in accordance with IS-95, the number of access probes per sequence is determined by the variable referred to as "NUM_STEP." The number of access probe sequences allowed per access attempt is referred to as "MAX_RSP_SEQ" (for responses) or MAX_REQ_SEQ (for requests). Therefore, for example, in this one embodiment, the product of NUM_STEP and MAX_REQ_SEQ defines the MAP parameter.

However, the present inventive method and apparatus is not limited for use in an IS-95 compliant cellular communication system. Other systems may use differing access techniques, and differing MAP parameters can be used with the present inventive method and apparatus. No matter what method is used to communicate the MAP parameter to the wireless unit, the wireless unit will store the MAP parameter in a register. Thereafter, the wireless unit will monitor the number of access attempts it makes, and it will produce a MAP symptom whenever the maximum number of access probes is attempted.

As shown in Table 3, there are at least three potential causes of the MAP symptom. The wireless unit might attempt too many access probes because the reverse link is weak. In this scenario, the base station may be unable to receive the probes due to a weak reverse link. Alternatively, a MAP symptom may be caused by reverse link interference. The reverse link interference can be caused by external sources or by rouge wireless units. In either case, the reverse link interference can prevent the base station from receiving messages on the access channel. The reverse link interference will also prevent the base station from receiving messages on the reverse traffic channel, assuming the wireless unit is eventually successful in gaining access to the channel.

There are at least two reasons why a wireless unit will fail to receive a base station acknowledgement order over the paging channel. If the pilot channel power is less than a certain threshold, Th1, and the wireless unit failed to receive a paging channel base station acknowledgement order, it is likely due to a weak forward link. In one embodiment, Th1 is −100 dBm in cellular systems, and is −103 dBm in PCS systems. In contrast, if the pilot channel power is greater than Th1 (i.e., greater than −100 dBm in cellular systems, or greater than −103 dBm in PCS systems) and the wireless unit failed to receive a paging channel base station acknowledgement order, it is likely due to fading or interference on the forward link. Additionally, both forward and reverse link channel fading characteristics can cause the wireless unit to fail to receive a channel assignment message over the paging channel. Finally, as shown in Table 3, insufficient traffic channel gains, forward channel link fading problems, and interference from competing pilot channels can prevent the wireless unit from being able to initialize the forward traffic channel.

Detecting and Processing Calls in a Weak Reverse Link Environment

System conditions exist wherein a wireless unit will display that it has a relatively strong received signal strength indication (RSSI), yet the user will be unable to initiate a call using the digital system. For purposes of the present invention, RSSI is defined as the received pilot channel power as measured by the wireless unit. Digital cellular systems are deployed in areas having forward and reverse link path loss imbalances as great as 20 dB. Under these conditions, the wireless unit will be unable to originate or receive telephone calls. Every time the wireless unit attempts to access the digital system under these conditions, it will exhaust all of its assigned access probes, and it will thereby fail the access process. Some of the causes of weak reverse links include excessive path loss, external interference on the reverse link, and improper system configurations (i.e., the system assigns an insufficient or inaccurate access parameter to the mobile). Other causes include excessive multipath problems (i.e., the base station has difficulty acquiring the reverse link) and excessive loading conditions.

The present invention reviews the many possible causes of call delivery and dropped call failures to determine whether the failure is due to a link imbalance. If the call delivery or dropped call failure is due to a link imbalance, the present invention assists the wireless unit in taking corrective action to process the call. The method of the present invention is invoked whenever a call delivery or dropped call failure occurs. The inventive method shown in FIG. 1 is invoked whenever a call delivery or dropped call failure occurs due to problems in the reverse link. The inventive method shown in FIG. 2 (and also FIG. 3) is invoked whenever a call delivery or dropped call failure occurs due to problems in the forward link.

As shown in FIG. 1, one embodiment of the present invention uses a "maximum access probe" (or "MAP") condition or symptom to detect weak reverse link conditions. In this embodiment, if a wireless unit detects a MAP condition during call origination attempts, page response attempts, or registration attempts, it declares a reverse link failure condition and attempts to use an alternative digital channel.

Referring now to FIG. 1, the present invention enters step 102 anytime a call delivery fails (or an in-progress call is dropped) due to failure of the reverse link. When the method shown in FIG. 1, is invoked the wireless unit has detected that a reverse link failure has occurred. However, it does not know whether the failure is due to a link imbalance or some other cause. The inventive method shown in FIG. 1 determines whether the call delivery failure is due to a "maximum access probe" condition caused by a weak reverse link. At decision step 104, the method of the present invention determines whether a "maximum access probe" condition exists. As described above with reference to Table 3, the wireless unit stores a MAP parameter in a register after receiving it from the base station (or after the wireless unit calculates the MAP value based upon the access probe information sent by the base station). The wireless unit compares the number of access attempts it makes and produces a MAP condition whenever the maximum number of access probes has been attempted.

In accordance with the present inventive method, if the wireless unit detects a maximum access probe condition when initiating origination, page or registration attempts, it declares a failure of the reverse link and proceeds to an alternate or "secondary" digital system. For example, as shown in FIG. 1, if the outcome of the MAP decision step 104 is positive (i.e., the "yes" path), the method proceeds to step 106. At step 106 the wireless unit attempts to access a "secondary" digital system associated with the primary system. At decision step 108 of FIG. 1, the wireless unit determines whether it successfully acquired the secondary digital system. If so, the method proceeds to step 110 to establish communication on the secondary system. If not, the method proceeds to step 112 and establishes communication on an analog system.

The method of the present invention operates slightly differently when used in a PCS system. Instead, each PCS wireless unit is programmed with a channel or "scan" list which contains a list of channels available to the wireless unit at any given point in time. More specifically, after activation, each PCS wireless unit stores a preferred roaming or "scan" list containing information that assists the wireless unit during system selection and system acquisition. The scan list is particularly useful to the wireless unit during roaming. Different means can be used to provide the mobile with the preferred scan list. For example, the scan list can be entered using the mobile's keypad. Alternatively, the list can be entered using a service programming station or an over-the-air service provisioning (OTASP) means. However obtained, once the scan list is received, it is retained by the wireless unit when the wireless unit's power is turned off. The scan list preferably includes a set of channels (systems) and a scanning order specifying the order that the wireless unit scans the channels when searching for service.

Modified CDMA systems will have more than just primary and secondary digital systems and will therefore use scan lists analogous to the PCS scan lists. The present inventive method will be used similarly in both PCS and modified CDMA systems. When the inventive method is used in PCS or modified CDMA systems, at step 106, instead of accessing a secondary system, the wireless unit attempts to access the first channel on its scan list. If this access attempt fails, the wireless unit shall attempt to access each channel in the scan list until it successfully acquires a channel or it exhausts the scan list. At decision step 108, the wireless unit determines whether it successfully acquired a channel on the scan list. If so, the method proceeds to step 110. If not, the method proceeds to step 112. At step 112, the present invention instructs the mobile to terminate access attempts on the digital system and to initiate access attempts on the analog system associated with the mobile's coverage area. Analog operation therefore commences at step 112.

If the secondary system (or one of the channels in the channel list of a PCS wireless unit) was successfully acquired, the method exits the decision step 108 and retries transmission on the secondary system (or on the next PCS channel) at step 110. The method of the present invention therefore terminates at step 110 in this situation.

Returning to decision step 104, if the MAP condition is not met, the method of the present invention proceeds to step 114. As shown in FIG. 1, if the maximum number of access probes has not been transmitted, the reverse link failed for some reason other than a weak reverse link condition (i.e., for some reason other than a link imbalance). In this case, the wireless unit will attempt one more access attempt on the primary system. However, according to the IS-95 specification, in order to initiate an additional communication attempt, the wireless unit must be demodulating the best paging channel. For this reason, as shown in FIG. 1, the wireless unit enters an "idle" state 114 before retrying transmission on the primary system at step 116. To both the communication channel and the base station, the "retry" on the primary system at step 116 appears as if it were initiated by the user via the wireless unit's user interface. However, the retry attempt at step 116 is transparent to the user.

In accordance with the present invention, the method checks to see whether the retry attempt was successful at decision step 118. If the retry attempt on the primary system was successful, the method exits the decision step 118 and remains on the primary system at step 120. However, if the retry attempt on the primary system was unsuccessful, the method attempts to access the secondary system (or alternate channels from the scan list in PCS systems) at step 106. The method proceeds from step 106 as described above.

In summary, if a call delivery attempt fails due to a reverse link failure, the present invention declares failure of the reverse link and switches operation to an alternate digital system. The alternate digital system comprises the secondary system in CDMA systems and alternate channels on the mobile's scan list in PCS systems. If the mobile fails to acquire the alternate digital channel, it switches operation to the analog system. The present method uses the maximum access probes condition to detect whether imbalance exists on the link, and more specifically, whether the reverse link is weaker than the forward link.

It should be noted that if and when service providers implement "timer-based registration," the wireless unit will be able to detect weaker reverse link conditions much sooner, and thereby minimize the possibility of remaining on the digital system more than is necessary. A timer-based registration system would require the wireless unit to register at fixed pre-determined intervals, compared, for example, to "power-up" registration methods wherein the wireless unit registers during power-up. In accordance with this method, during power-up, the wireless unit switches from using a different PCS frequency block, a different band class, or an alternate operating mode.

Detecting and Processing Calls in a Weak Forward Link Environment

Weak forward links cause poor paging channel performance, resulting in loss of the paging channel when the mobile enters a System Access State. Consequently, the wireless unit will fail to receive a channel assignment message, fail to receive a base station acknowledgement order, and fail to initialize the traffic channel. As described above with reference to Table 3, some of the causes of a weak forward link condition include excessive path loss, interference from other cells (from base stations that are on the neighbor list and from base stations that are not on the neighbor list), external sources of interference, and inadequate traffic channel power allocation at initialization. The method shown in FIGS. 2 and 3 detects whether a forward link failure is due to a weak forward link and processes calls appropriately. In one embodiment, the method uses an "exit codes" condition as a detection mechanism.

The "exit codes" condition occurs each time the wireless unit exits the system with which it is attempting to communicate. For example, in an IS-95 based system, the "exit codes" condition occurs when the wireless unit performs a "system exit" function. According to IS-95, when the wireless unit loses a paging channel, for any reason, the wireless unit proceeds to a system initialization state. This process is commonly referred to as a "system exit." The causes for performing a system exit function vary and depend upon the state of the wireless unit when it loses the paging channel. For example, if the wireless unit is "idle" and does not receive good paging channel messages for a first pre-defined period of time (e.g., 3 seconds), the wireless unit will exit the system with an "exit codes" condition of "system loss in idle state." The wireless unit will proceed to a system initialization state. Alternatively, if the wireless unit is in a system access state and it does not receive good paging channel messages for a second pre-defined period of time (e.g., 1 second), the wireless unit will exit the system with an "exit codes" condition of "loss of paging channel in system access state." The wireless unit will again proceed to a system initialization state.

Figure 2:
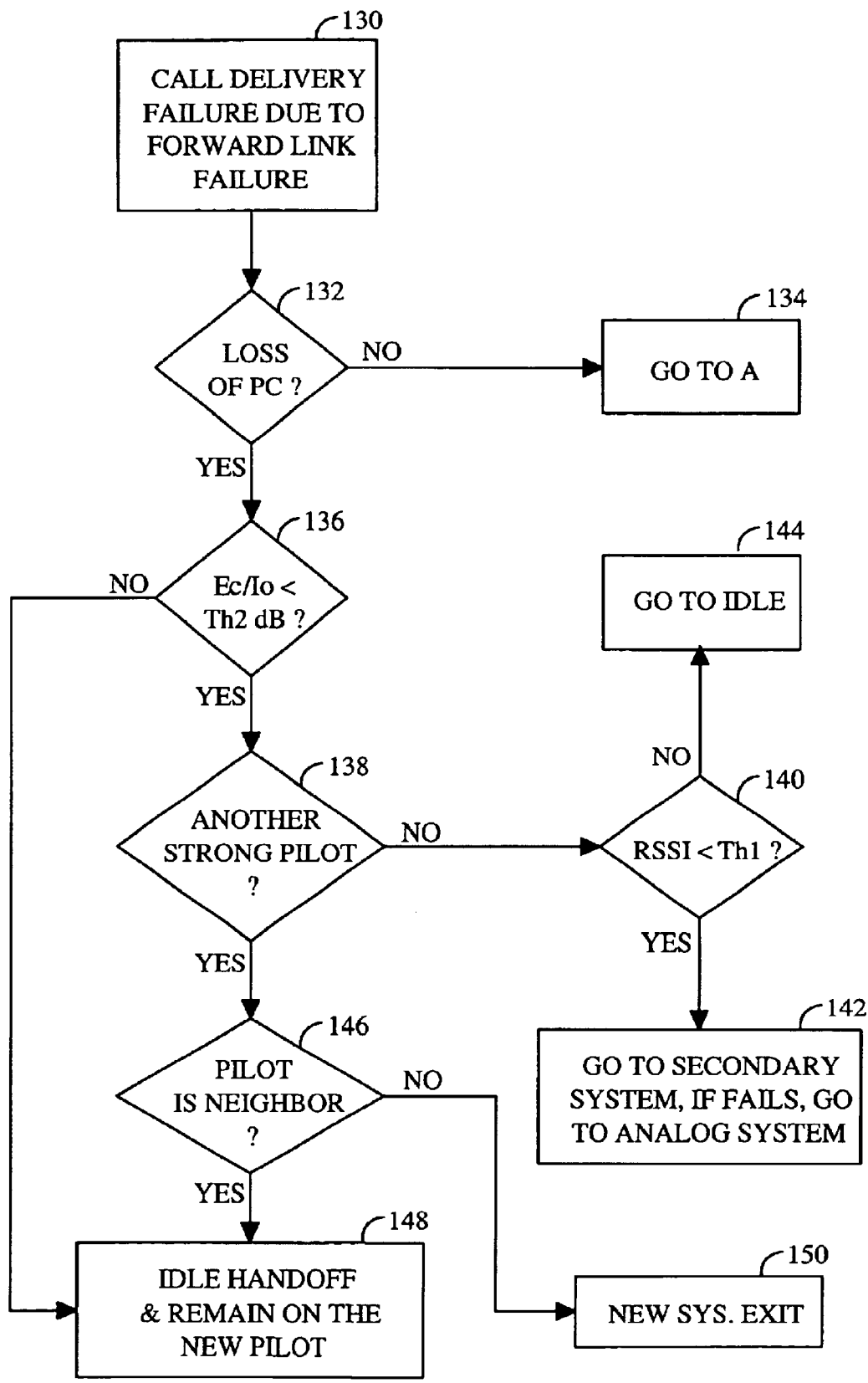
FIG. 2 is a flow diagram showing the present inventive method for determining whether a forward link failure is due to a weak forward link, resulting in loss of the paging channel.

Referring now to FIG. 2, the present invention enters step 130 whenever a call delivery fails due to a failure in the forward link. When the method shown in FIG. 2 is invoked, the wireless unit has determined that a forward link failure occurred. However, it has yet to determine whether the failure is due to a link imbalance or some other cause. As shown in FIG. 2, the method of the present invention enters decision step 132 to first determine whether the call delivery failure is due to a lost paging channel. If the call delivery failure is not due to a lost paging channel (i.e., the "no" exit path from step 132), the method leaves decision step 132 and proceeds to step 134. Step 134 and its successive steps are described in more detail hereinbelow with reference to FIG. 3. If the call delivery failure is due to a lost paging channel (i.e., the "yes" exit path from step 132), the method leaves decision step 132 and proceeds to decision step 136.

The forward link may have failed because of weak paging channel power or weak pilot channel power. The paging channel power may be weak due to an incorrect gain setting at the base station. If so, there is very little the wireless unit can do to establish communication with the affected base station. Therefore, the method of the present invention measures the received pilot signal-to-noise ratio at step 136 if it determined (at decision step 132) that the wireless unit lost the paging channel. More specifically, at step 136, the wireless unit tests the ratio of the received pilot energy to the overall received energy. This ratio is referred to in the IS-95 specification as the "pilot strength." As defined in the IS-95 specification, the pilot strength is the ratio (in dB) between the pilot energy accumulated over one pseudo-noise (PN) chip period (Ec) to the total power spectral density in the received bandwidth (Io).

In one embodiment, the method determines whether the pilot strength is less than a pre-defined threshold value (Th2). As shown in FIG. 2, at decision step 136, the present inventive method determines whether the pilot strength is less than Th2. In one embodiment, Th2 equals −13 dB. This is a typical value that is empirically determined based upon field experiments. Other threshold values can be used depending upon particular system environments. If the pilot strength is not less than Th2 (i.e., the pilot strength is sufficiently high), the method proceeds to step 148, performs an idle handoff, and retries communication with a neighboring base station as described below in more detail. However, if the pilot strength is less than Th2, it is insufficient, and the method proceeds to decision step 138.

If the received power on the pilot channel is insufficient (i.e., Ec/Io is less than Th2), the method proceeds to decision step 138 to determine whether another strong pilot channel is available to the wireless unit. If another strong pilot is available, the method proceeds to decision step 146. However, if another strong pilot channel is not available, the method proceeds to step 140 to determine why. There are only two possibilities: (1) either the wireless unit is too far away from the base station; or (2) significant interference exists on the pilot channel (i.e., other wireless units may be competing for the pilot channel). At decision step 140, the present method compares the mobile's RSSI to a predetermined threshold value. If the mobile's RSSI is less than the threshold, the pilot energy is low because the wireless unit is too far away from the base station. In this case, the mobile attempts access on a secondary system. However, if the mobile's RSSI is greater, the threshold, the pilot signal-to-noise ratio is low due to pilot channel interference. In this case, the mobile enters an idle state.

More specifically, and referring again to FIG. 2, at decision step 138, the method determines whether the RSSI for this mobile is below a pre-determined threshold value Th1. Based upon typical link budget parameters, the value of Th1 is preferably −100 dBm for digital cellular systems and −103 dBm for PCS systems. However, this value varies and is dependent upon the coverage link budget. The link budget is dependent upon several system parameters such as the threshold signal power of the low noise amplifier (LNA) and the receiver noise figure. If the RSSI is less than Th1 (i.e., the mobile is too far away from the base station), the method proceeds to step 142. At step 142 the wireless unit attempts access on a secondary digital system (when operating within a CDMA system). As described above with reference to FIG. 1, PCS and some systems outside the United States will attempt access on each channel in the mobile's scan list until the list is exhausted. If the wireless unit acquires no system, it will initiate an analog communication using an analog system if one is available. Therefore, if the attempt fails in step 142, the wireless unit switches to an analog mode of operation. If the mobile's RSSI is greater than Th1 at decision step 140 (i.e., the pilot channel energy is low due to interference), the present method proceeds to step 144 wherein the wireless unit enters an idle state.

As described above, the method determines whether a strong pilot is available at decision step 138. If another strong pilot is available, the mobile determines whether the pilot channel belongs to a base station found on the wireless unit's "neighbor list." Each base station preferably sends to each wireless unit a list of neighboring base stations referred to as the "neighbor list." One example of a system that uses neighbor lists is the CDMA cellular communication system designed in accordance with the IS-95 specification. In PCS systems, the neighbor list is provided by neighbor list messages and extended neighbor list messages.

Wireless units are only allowed to perform idle handoffs to "neighboring" base stations, i.e., to base stations that are on the mobile's neighbor list. If the base station is on the mobile's neighbor list, the wireless unit initiates an "idle handoff" and attempts access on the new pilot channel. If not, the mobile performs a "new system exit" and enters an idle state. More specifically, and referring again to FIG. 2, the method determines whether the strong pilot is a neighbor at decision step 146. If the pilot is a neighbor, the method proceeds to step 148 wherein the wireless unit performs an "idle handoff" and retries transmission on the new pilot channel. There are two types of handoffs in a CDMA system. When a wireless unit is already communicating using a traffic channel, it can perform a "soft" handoff to switch between two different base stations. Soft handoffs occur when a wireless unit is in communication with a first and second cell simultaneously, and the wireless unit switches communication to a second cell when it moves out of the coverage area of a first cell. In contrast, idle handoffs occur when the wireless unit is not currently in the traffic channel. Idle handoffs occur when switching between two pilot channels as in step 148. If the pilot is not a neighbor, the method proceeds to step 150 and performs a "new system exit." At this point the wireless unit enters an idle state and does not retry transmission on the digital system.

Figure 3:
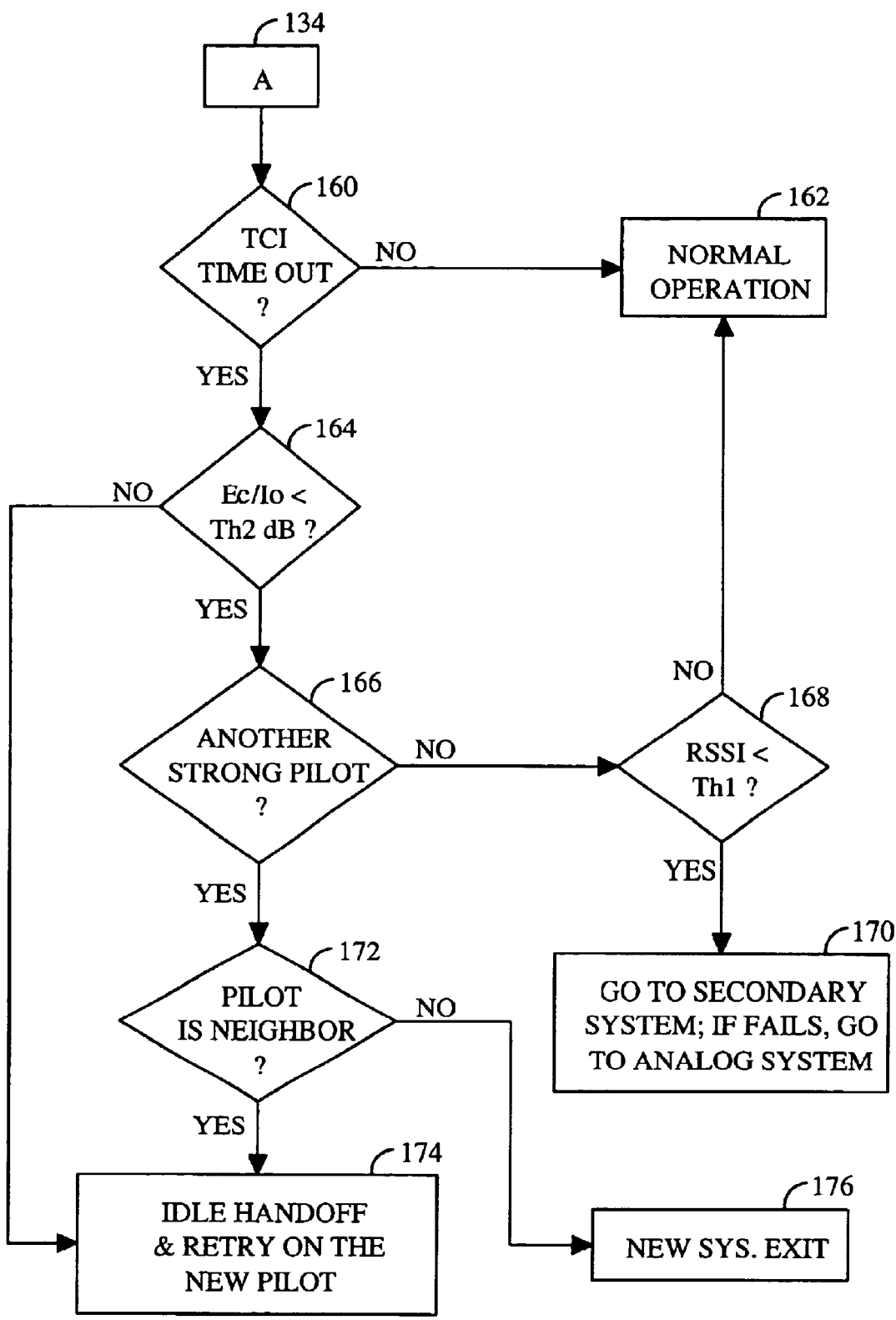
FIG. 3 is a flow diagram showing the present inventive method for determining whether a forward link failure is due to a weak forward link, resulting in a TCI timeout.

Referring now to FIG. 3, the method proceeds to step 134 if a forward link failure is encountered and the paging channel is not lost. If there is no loss of paging channel the present method checks for the occurrence of a Traffic Channel Initialization (TCI) timeout in decision step 160. According to the IS-95 specification, a TCI timeout occurs whenever the wireless unit is unable to initialize the traffic channel within a given interval of time. If a TCI timeout has occurred, the present inventive method tests for link imbalances as described above with reference to FIG. 2 (i.e., by testing the pilot strength and the RSSI). However, if the TCI did not timeout, then there is no imbalance in the forward and reverse links. The forward link failed. However, the failure was not due to a link imbalance problem. Therefore, if a TCI timeout did not occur, the present inventive method returns the wireless unit to "normal" operation at step 162.

More specifically, and referring again to FIG. 3, the present inventive method determines whether a TCI timeout condition exists in decision step 160. If no TCI timeout did occur, the method proceeds to step 162, wherein the wireless unit resumes normal operation. However, if a TCI timeout did occur, the method proceeds to decision step 164, wherein the pilot strength is tested. The remaining steps shown in FIG. 3 perform identically to those described above with reference to FIG. 2. Specifically, step 164 performs the same function as step 136. Similarly, steps 166, 168, 170, 172, 174, and 176 of FIG. 3 perform the same functions as steps 138, 140, 142, 146, 148, and 150 of FIG. 2, respectively. The only exception is that, instead of entering an idle state (e.g., step 144 of FIG. 2) when the RSSI is greater than Th1 at decision step 168, the wireless unit returns to normal operation at step 162. Other than this exception, the remaining steps of FIG. 3 function as described above with reference to FIG. 2.

Thus, in summary, the method shown in FIGS. 2 and 3 is invoked whenever a wireless unit encounters a forward link failure. As shown in FIG. 2, the method first determines whether the wireless unit lost the paging channel. If not, the method proceeds to step 160 (FIG. 3) to determine whether a TCI timeout has occurred. If no TCI timeout has occurred (and the paging channel was not lost), the forward link failure is not due to a link imbalance. Consequently, the method proceeds to step 162, wherein the wireless unit resumes normal operation. However, if the paging channel was lost (as determined in decision step 132), or if the TCI timed out (as determined in decision step 160), the method proceeds to determine the causes for the error condition as described in more detail hereinabove.

As shown in FIGS. 1–3, the method of the present invention switches operation to another available channel (either via a secondary system as shown in FIG. 1 or via an idle handoff as shown in FIGS. 2 and 3) when it determines that a link imbalance condition exists. Although it may appear logical to switch operation to a secondary system or different channel, it should be noted that the IS-95 specification normally prohibits wireless units from switching to other channels when a problem is detected on a channel. Rather, the IS-95 specification mandates that the wireless unit enters a system initialization state, wherein the wireless unit selects the best CDMA channel available. It is therefore very unusual for a wireless unit conforming to the IS-95 specification to switch operation to other channels when it encounters problems on a first channel. In accordance with the IS-95 specification, wireless units are normally only permitted to switch to another channel when they are instructed to do so by the system. However, IS-95 provides no mechanism for processing call delivery failures caused by imbalances in the forward and reverse links. The present inventive method permits wireless units to both detect link imbalance conditions and to switch to other channels if an imbalance condition exists. Channel switching is preferably performed in a manner that does not conflict with IS-95. Therefore, the present invention provides a mechanism for processing call delivery failures caused by link imbalances that conforms to the IS-95 specification.

The method of the present invention preferably executes on a microprocessor or other data processing device in the wireless unit. Alternatively, the method can be implemented using any convenient or desirable sequencing device, such as a state machine, present state-next state discrete logic, or field programmable gate array device.

In summary, the invention includes a means for determining whether a forward or reverse link imbalance exists and a means for processing calls based upon the determination. The present invention advantageously reduces interference, improves system capacity and improves call delivery rates in a digital cellular communication system. By reducing the amount of access attempts made by wireless units having link imbalances, the present invention reduces interference to other users already communicating on the system. Consequently, the present invention improves call capacity. The present invention is particularly useful in broadband wireless digital communication systems such as CDMA cellular systems. However, it also finds utility in CDMA PCS and other digital cellular communication systems. The handshake protocols described above are identical in both the CDMA and the PCS systems, and are more fully described in the well-known IS-95 specification. The only significant difference between the CDMA cellular and CDMA PCS systems is the frequency bands used for communication.

Figure 4:
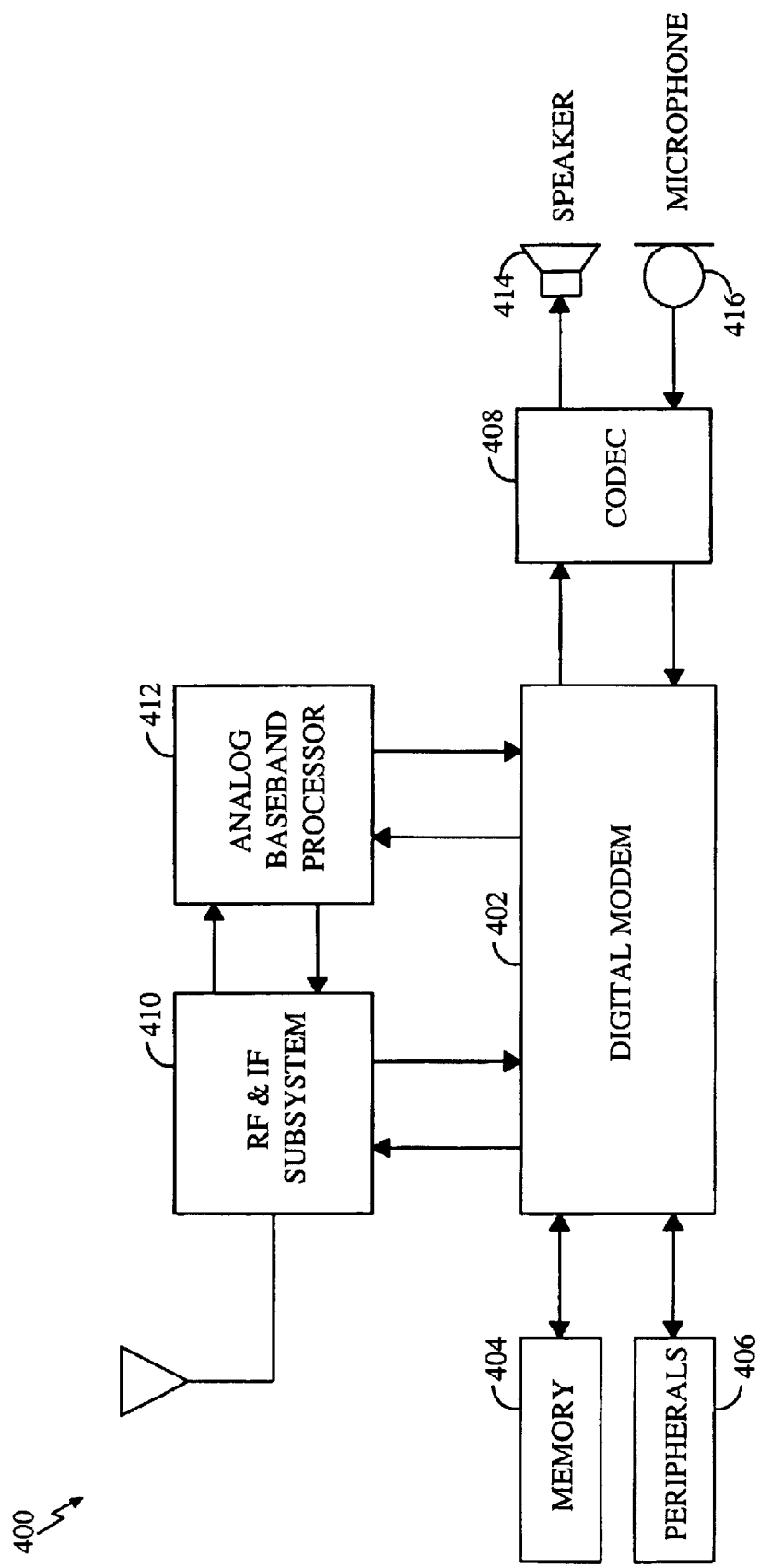
FIG. 4 is a simplified block diagram of a typical wireless unit.

FIG. 4 is a simplified block diagram of a typical wireless unit 400. The wireless unit 400 includes a digital modem 402, memory 404, peripherals 406, a codec 408, an RF (radio frequency) and IF (intermediate frequency) subsystem 410, an analog baseband processor 412, a speaker 414, and a microphone 416. The digital modem 402 controls the RF & IF subsystem 410, the analog baseband processor 412, the memory 404, and the peripherals (which include such devices as keyboards, keypads, liquid crystal diode displays, ringers, the microphone 416, and the speaker 414). The digitial modem also contains complete digital modulation and demodulation systems for both CDMA and AMPS cellular standards.

The wireless unit 400 software controls most of the functionality and activates the features of the wireless unit. The link imbalance algorithm is one of the several routines stored in the memory 404. The software is executed by the embedded microprocessor within the digital modem 402.

A number of embodiments of the present invention have been described. Nevertheless, it will be understood that various modifications may be made without departing from the spirit and scope of the invention. For example, the present invention may use a variety of system parameters (if and when they become available) as link imbalance detection mechanisms. As described above, in one embodiment, the present invention uses the "maximum access probes" parameter to detect a weak reverse link imbalance. In the embodiment described, the present invention uses the "exit codes" parameter (loss of paging channel or TCI timeout) to detect a weak forward link imbalance. However, the present invention is not so limited. Any other system parameter or means that reliably detects link imbalances can be used with the present invention. Also, communication carriers can optionally use the present inventive link imbalance detection method and apparatus to address the adverse affects associated with link imbalances. Some carriers may have very robust systems having back-up systems available in case of link failures. Others may not. The present invention, therefore, is a solution that may be optionally utilized by communication carriers.

Accordingly, it is to be understood that the invention is not to be limited by the specific illustrated embodiment, but only by the scope of the appended claims.

What is claimed is:

1. An apparatus for detecting link imbalances in a digital cellular communication system comprising a plurality of wireless units and a plurality of base stations, wherein transmissions from the base stations to the wireless units are made using forward radio communication links and wherein transmissions from the wireless units to the base stations are made using reverse radio communication links, and wherein each forward link includes control and forward traffic channels, and each reverse link includes control and reverse traffic channels, the apparatus comprising:

means for detecting a link failure in a first radio communication link between a wireless unit and a first base station during a call initiation, the means for detecting the link failure comprising means for determining whether the failure in the first radio communication link comprises a reverse link failure or a forward link failure;

means for determining whether the link failure is due to a link imbalance in the first radio communication link;

means for instructing the wireless unit to switch to a second radio communication link if the link imbalance exists;

means for determining if the reverse link failure is due to a weak reverse link, the means for determining if the reverse link failed due to a weak reverse link comprising means for determining whether a maximum number of access probes has been transmitted by the wireless unit to the first base station, wherein a value for the maximum number of access probes is transmitted in an access parameters message which is sent by the first base station to the wireless unit over a control channel associated with a forward link of the first base station;

means for initiating by the wireless unit communication on a secondary communication system if the maximum number of access probes has been transmitted by the wireless unit to the first base station; and means for entering by the wireless unit an idle state and then re-initiate communication with a primary digital cellular communication system if the maximum number of access probes has not been transmitted by the wireless unit to the first base station.

2. The apparatus of claim 1, further comprising:

means for determining whether the wireless unit successfully re-initiated communication with the primary digital cellular communication system and remaining on the primary digital cellular communication system if the communication was successful;

means for initiating by the wireless unit communication on the secondary communication system if the wireless unit has not successfully re-initiated communication with the primary digital cellular communication system; and means for determining whether the wireless unit successfully acquired the secondary communication system and initiating by the wireless unit communication on an analog communication system if the secondary communication system was not successfully acquired.

3. The apparatus of claim 2, wherein the communication on the secondary communication system is initiated if the link imbalance exists by causing the wireless unit to perform an idle handoff and to initiate communication with the primary communication system on the second radio communication link if:

a pilot signal strength from a second base station of the primary communication system is sufficient; and the second base station is a neighbor base station.

4. The apparatus of claim 3, wherein the pilot signal strength is measured by taking a ratio (in dB) of pilot energy received by the wireless unit and accumulated over one pseudo-noise (PN) chip period ($E_c$) to the total power spectral density in the received bandwidth ($I_o$).

5. The apparatus of claim 4, wherein the pilot strength is insufficient if $E_c/I_o$ is less than −13 dB.

6. The apparatus of claim 4, wherein the pilot strength is sufficient if $E_c/I_o$ is greater than or equal to −13 dB.

7. The apparatus of claim 2, wherein the communication on the secondary communication system is initiated if:

a pilot signal strength from a second base station of the primary communication system is insufficient; and a received signal strength indicator received by the wireless unit is less than a predetermined threshold value.

8. The apparatus of claim 7, wherein the predetermined threshold value is −100 dBm in code division multiple access (CDMA) systems, and wherein the predetermined threshold value is −103 dBm in personal communications services (PCS) systems.

9. The apparatus of claim 7, wherein the predetermined threshold value is dependent upon a link budget associated with the communication link between the wireless unit and the first base station.

* * * * *